(12) United States Patent
Schaal

(10) Patent No.: US 12,454,166 B2
(45) Date of Patent: Oct. 28, 2025

(54) AIR VENT

(71) Applicant: fischer automotive systems GmbH & Co. KG, Horb a.N. (DE)

(72) Inventor: Falk Schaal, Loßburg (DE)

(73) Assignee: MATIKON GMBH & CO. KG, Horb a.N. (DE)

(*) Notice: Subject to any disclaimer, the term of this patent is extended or adjusted under 35 U.S.C. 154(b) by 354 days.

(21) Appl. No.: 17/979,050

(22) Filed: Nov. 2, 2022

(65) Prior Publication Data

US 2023/0144058 A1   May 11, 2023

(30) Foreign Application Priority Data

Nov. 8, 2021  (DE) ............... 10 2021 128 955.6
Sep. 21, 2022  (DE) ............... 10 2022 124 212.9

(51) Int. Cl.
*B60H 1/34*  (2006.01)
(52) U.S. Cl.
CPC ... *B60H 1/3414* (2013.01); *B60H 2001/3478* (2013.01)
(58) Field of Classification Search
CPC .............. B60H 1/3414; B60H 2001/3478
See application file for complete search history.

(56) References Cited

U.S. PATENT DOCUMENTS

| | | | |
|---|---|---|---|
| 9,452,304 B2 * | 9/2016 | Ryu | ............ A62C 2/20 |
| 2005/0210753 A1 | 9/2005 | Sawai | |
| 2008/0112155 A1 | 5/2008 | Scown et al. | |
| 2017/0009858 A1 * | 1/2017 | Klode | ............ F16D 65/16 |
| 2021/0001694 A1 | 1/2021 | Bastian et al. | |
| 2022/0120467 A1 * | 4/2022 | Anderson | ............ F24F 11/74 |

FOREIGN PATENT DOCUMENTS

| | | |
|---|---|---|
| CN | 2 07 902 106 U | 9/2018 |
| CN | 111559226 A | 8/2020 |
| DE | 69 35 036 U | 12/1969 |
| DE | 36 28 449 A1 | 2/1988 |
| DE | 20 2011 050 032 U1 | 7/2011 |
| DE | 102019118239 A1 | 1/2021 |

OTHER PUBLICATIONS

Search Report for corresponding German Patent Application No. 10 2021 128 956.4, dated Feb. 22, 2022.

* cited by examiner

*Primary Examiner* — Connor J Tremarche
(74) *Attorney, Agent, or Firm* — Renner, Otto, Boisselle & Sklar, LLP

(57) ABSTRACT

An air vent for a motor vehicle with two air control elements that are disposed inside one another, the outer air control element of which is tubular in such a way that the air control elements delimit a first air channel between one another, and the outer air control element delimits a second air channel between itself and a tubular housing of the air vent. For restricting an air current flowing through the air vent, the two air control elements can be displaced by way of two helical gears coaxially in the housing, which are disposed coaxially inside one another and in the housing and which include a tube including an internal thread and an external thread, serving as a shared drive element, which forms a spindle nut for an interior, and a (hollow) spindle for an exterior, of the two helical gears.

7 Claims, 1 Drawing Sheet

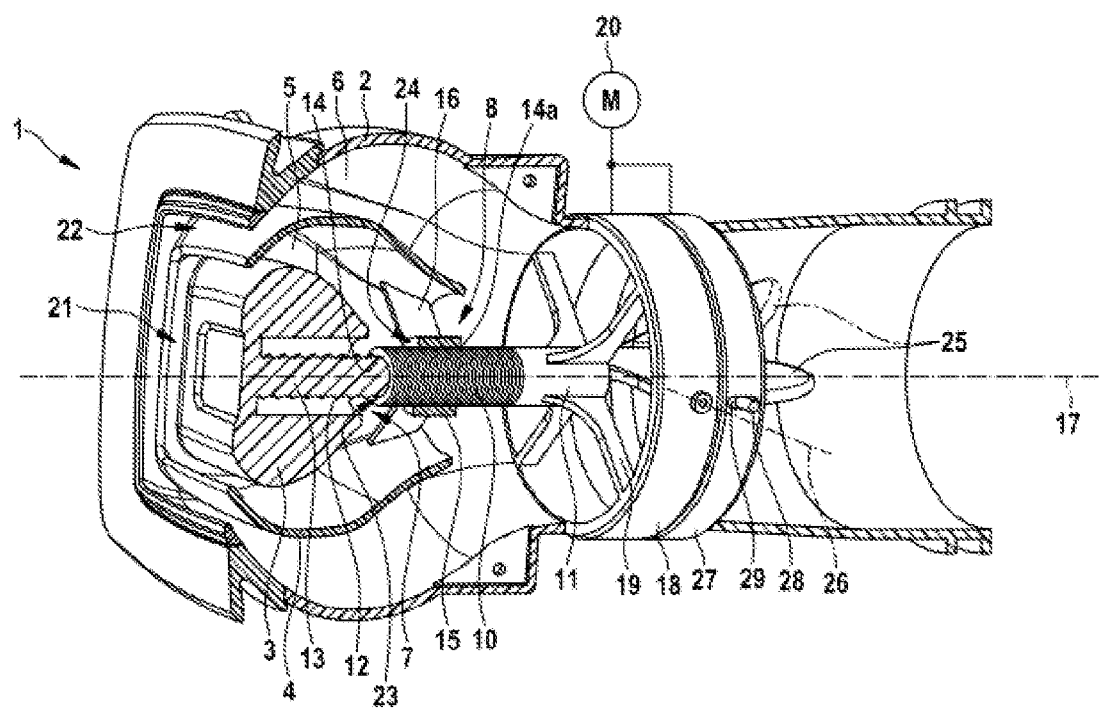

ized rities
AIR VENT

CROSS-REFERENCE TO RELATED APPLICATIONS

This application claims priority under 35 USC § 119 to German Patent Application No. 10 2021 128 955.6, filed Nov. 8, 2021, and German Patent Application No. 10 2022 124 212.9, filed Sep. 21, 2022, the entire disclosures of which are incorporated herein by reference.

TECHNICAL FIELD

The invention relates to an air vent.

DISCUSSION OF RELATED ART

Air vents are known for ventilating a passenger compartment of a motor vehicle. They are disposed, in particular in a recessed manner, in an instrument panel, a center console or another interior trim panel part of the passenger compartment of the motor vehicle in a recessed manner such that an air outlet opening of the air vent is flush with a surface of the interior trim panel part facing the passenger compartment. Air vents typically comprise a tubular housing or an air channel in which movable air control elements are disposed. "Air control elements" shall be understood to mean both air guide elements and air volume control elements. Air guide elements guide an air current through the air vent, and in particular in a direction of an outflow of the air out of the air vent into the passenger compartment to the left, to the right, to the top and to the bottom. For example, air vents comprise pivotable blades or flaps, serving as air guide elements. Air volume control elements control an air volume flowing through the air vent, and air volume control elements in particular restrict the air current flowing through the air vent by decreasing a flow cross-section or increasing an airflow resistance of the air vent in another manner. Air volume control elements are, for example, pivotable dampers or displaceable damper slides. Whether intended or unintended, air guide elements can also act as air volume control elements, and vice versa.

SUMMARY OF THE INVENTION

It is the object of the invention to propose a design configuration of a drive or of an actuator for one or more air control elements of an air vent.

The air vent according to the invention comprises a first, displaceable air control element and a first sliding guide, which displaceably guides the first air control element in the direction of a flow axis. The "flow axis" is an imaginary axis along which the air current flows through the air vent. For displacing the first air control element, the air vent according to the invention comprises a first helical gear, which converts a rotation into a displacement of the first air control element in the direction of the flow axis. The first sliding guide extends parallel to an axis of rotation of the first helical gear, which shall be understood to mean that the first sliding guide displaceably guides the first air control element parallel to the axis of rotation of the helical gear and parallel to the flow axis. "Parallel" shall be understood to mean both a parallel displacement that is coaxial with respect to the axis of rotation of the first helical gear and a parallel displacement that is radially offset with respect to the axis of rotation of the first helical gear. When the first helical gear is rotatably driven, the first helical gear displaces the first air control element along the first sliding guide or, in any case, parallel to the axis of rotation of the first helical gear or parallel to the flow axis. The invention enables a central arrangement of a drive or, in any case, of the first helical gear as part of the drive, in an air vent.

A preferred embodiment of the invention provides a second air control element and a second sliding guide, which displaceably guides the second air control element parallel to the first sliding guide, and thus also parallel to the axis of rotation of the first helical gear. This embodiment of the invention furthermore comprises a second helical gear, which, when the second helical gear is rotatably driven, displaces the second air control element along the second sliding guide, and thus coaxially with respect to or parallel to the first sliding guide and the second sliding guide and the axes of rotation of the first helical gear and the second helical gear. The axes of rotation of the helical gear are disposed parallel to the flow axis. In particular, the two helical gears are disposed coaxially behind one another, and preferably coaxially inside one another. The arrangement of the two helical gears coaxially inside one another in particular enables a space-saving arrangement and an advantageous design of the two helical gears.

A refinement of the invention provides that the two helical gears have differing thread pitches so as to displace the two air control elements at differing speeds and/or in opposite directions, while being rotatably driven at identical speeds. The thread pitches of the two helical gears have differing heights and/or are oppositely oriented in this embodiment of the invention, the latter meaning that one of the two helical gears has a right-handed thread, and the corresponding other helical gear has a left-handed thread.

A preferred refinement of the invention provides a shared drive element for the two helical gears. This means that the two helical gears comprise a shared rotary drive.

In a preferred embodiment of the invention, the shared drive element includes an external thread and an internal thread that is coaxial with respect to the external thread, and in particular coaxial within the external thread. For example, the shared drive element is tubular or, in any case, includes a hole that is coaxial with respect to the external thread and includes an internal thread. The shared drive element thus, so-to-speak, forms a spindle nut for an interior of the two helical gears and a spindle for an exterior of the two helical gears, wherein the spindle nut, generally speaking, is a part including the internal thread, and the spindle, generally speaking, is a part including an external thread that is coaxial with respect to the internal thread, namely the shared drive element of the two helical gears. The assignment as to which of the two helical gears is the interior one and which is the exterior one is arbitrary; hereafter, the interior helical gear is referred to as the first helical gear, and the exterior helical gear is referred to as the second helical gear. The interior or first helical gear comprises a spindle or, generally speaking, a component including an external thread, which is coaxial with respect to the internal thread of the shared drive element and which engages with the internal thread of the shared drive element in such a way that, when the shared drive element is rotatably driven, the spindle or the component of the first helical gear which includes the external thread is coaxially displaced, displacing the first air control element coaxially with respect to or parallel to the axis of rotation of the two helical gears in the process. The exterior or second helical gear comprises a spindle nut or, generally speaking, a component including an internal thread, which is coaxial with respect to the external thread of the shared drive element and which engages with the external thread of the shared drive element in such a way that, when the shared drive element is rotatably driven, the spindle nut or, generally speaking, the component of the second helical gear which includes the internal thread is coaxially displaced, displacing the second air control element of the air vent according to the invention coaxially with respect to or parallel to the axis of rotation of the two helical gears in the process. As a result of the shared drive element of the two helical gears being rotatably driven, the two helical gears jointly displace the two air control elements coaxially with respect to, or parallel to, the helical gears, and with respect to one another. This embodiment of the invention results in a compact design of the two helical gears comprising a shared drive of the two air control elements, with differing displacement speeds and/or displacement directions of the two air control elements being possible.

In particular, one of the two air control elements is, or both air control elements are, air volume control elements controlling an air volume flowing through the air vent. In particular, the one air control element is, or the two air control elements are, air restriction elements, which, when moving, restrict the air current flowing through the air vent, which is to say, in particular, decrease a flow cross-section of the air vent or increase a flow resistance of the air vent in another manner.

One embodiment of the invention provides for the two air control elements to be disposed inside one another. The first air control element is disposed as an interior air control element in the second air control element, which, for this purpose, is designed to be tubular or channel-like, for example, wherein a shape and/or a surface area of a cross-section of the second air control element can change over the length thereof. The two air control elements delimit a first air channel having a first air outlet opening between one another, wherein the first air channel is, in particular, annular and surrounds the first air control element in the second air control element. A cross-section of the first air channel does not have to be annular, but rather can, in general, be arbitrary. Embodiments in which the first air channel only partially surrounds the first air control element, or the first air channel is only disposed on one side of the first air control element, are possible.

The second air control element is disposed in a, for example, likewise tubular or channel-like housing, wherein the housing and the second air control element delimit a second air channel having a second air outlet opening between one another. The second air channel is also, in particular, annular and surrounds the second air control element in the housing, wherein a second air channel that only partially surrounds the second air control element or that is only disposed on one side of the second air control element is also possible here. In addition to two air channels that are disposed inside one another in an annular manner, two air channels that are disposed next to one another are also possible, for example.

The first air control element is preferably displaceably guided in the second air control element so as to vary a cross-sectional surface area of the first air channel through which air can flow, whereby a restriction of the air current flowing through the first air channel is possible. The second air control element is displaceably guided in the housing so as to vary a cross-sectional surface area of the second air channel through which air can flow and thereby restrict the air current flowing through the second air channel.

In particular, one of the two air control elements or the two air control elements can be displaced in the direction of the air outlet openings of the two air channels and opposite one another such that distances between the air control elements and the air outlet opening can be varied. Varying the distances between the air control elements and the air outlet openings in particular serves to block the air outlet openings to varying degrees by way of the air control elements and thereby restrict the air currents flowing through the two air channels.

Preferably, one of the two air channels or both air channels can also be closed by the displacement of the two air control elements so as to not only restrict, but suppress the air current. In particular, the air control elements close the air outlet openings of the air channels. A hermetically sealed closure of the air channels is not mandatory. It is possible for an air current to flow through gaps or the like of the air channels closed by the air control elements.

The features and feature combinations, embodiments and configurations of the invention mentioned above in the description, and the features and feature combinations mentioned hereafter in the description of the figures and/or shown in a figure, can be used not only in the respective indicated or illustrated combination, but also in other essentially arbitrary combinations, or alone. Embodiments of the invention that do not include all the features of a dependent claim are possible. It is also possible to replace individual features of a claim with other disclosed features or feature combinations. Embodiments of the invention that do not include all the features of the exemplary embodiment, but an essentially arbitrary portion of the characterizing features of the exemplary embodiment, are possible.

BRIEF DESCRIPTION OF THE DRAWING

The invention will be described hereafter in greater detail based on one exemplary embodiment shown in the drawing.

FIG. 1 shows an axial section of an air vent according to the invention.

DETAILED DESCRIPTION OF THE INVENTION

The air vent 1 according to the invention shown in FIG. 1 is intended for recessed installation in an instrument panel or a center console of a passenger compartment of a motor vehicle, which is not shown. The air vent comprises a tubular or channel-like housing 2 having a cross-section that varies across the length thereof, which is installed into the instrument panel or the center console in a recessed manner and with an edge of an air outlet opening 21, 22 flush in an opening of a surface of the instrument panel or of the center console which faces the passenger compartment.

The air vent 1 comprises two air control elements 3, 4, of which a first air control element 3 is disposed in a second air control element 4, and the second air control element 4 is, or both air control elements 3, 4 are, disposed in the housing 2.

In the exemplary embodiment, the two air control elements 3, 4 can be interpreted as being pear-shaped, wherein the second air control element 4 is tubular and surrounds the first air control element 3 such that the two air control elements 3, 4 delimit an annular first air channel 5, which surrounds the first air control element 3 in the second air control element 4, between one another. The second air control element 4 and the housing 2 likewise delimit a likewise annular second air channel 6 between one another, which surrounds the second air control element 4 in the housing 2.

In the exemplary embodiment, the two air control elements 3, 4 and the housing 2 have rectangle-like, substantially square cross-sections, having convexly curved sides and rounded regions, instead of corners; however, this is not essential for the invention. The air control elements 3, 4 are disposed coaxially inside one another and in the housing 2.

Two helical gears 7, 8 are disposed coaxially inside one another, coaxially in the housing 2, and comprise a tube including an internal thread 14 and an external thread 10 that is coaxial with respect to the internal thread 14, serving as a shared drive element 11. The internal thread 14 of the shared drive element 11 engages with an external thread 12 of a spindle 13, which is rigidly connected to the first air control element 3. The external thread 10 of the shared drive element 11 engages with an internal thread 14a of a sleeve, which is referred to as a spindle nut 15 here. The spindle nut 15 is rigidly connected to the second air control element 4 by way of radial ribs 16. In the exemplary embodiment, the spindle 13 is integral with the first air control element 3, and the spindle nut 15 is integral with the second air control element 4.

The shared drive element 11 and the spindle 13 form the first helical gear 7 for displacing the first air control element 3 in the second air control element 4, and the shared drive element 11 and the spindle nut 15 form the second helical gear 8 for displacing the second air control element 4 in the housing 2 of the air vent 1 according to the invention. The shared drive element 11 is an integral part of the two helical gears 7, 8 and may be interpreted as a spindle nut of the first helical gear 7 and as a (hollow) spindle of the second helical gear 8, wherein the sleeve including the internal thread 14a can be interpreted as the spindle nut 15 thereof.

As a result of the shared drive element 11 being rotatably driven, both the displacement of the spindle 13 together with the first air control element 3 and the displacement of the spindle nut 15 together with the second air control element 4 are carried out coaxially with respect to an axis of rotation 17 of the two helical gears 7, 8. The axis of rotation 17 corresponds to the flow axis here, along which the air current flows through the air vent 1. In the exemplary embodiment, the two helical gears 7, 8 include right-handed threads, which is to say, threads having pitches oriented in the same direction; however, in the exemplary embodiment, the first helical gear 7 has a larger thread pitch than the second helical gear 8 so that, when the shared drive element 11 is being rotatably driven, the first air control element 3 moves more quickly and to a greater extent than the second air control element 4. In the exemplary embodiment, the thread pitch of the first helical gear 7 is twice as large as the thread pitch of the second helical gear 8, so that, when the shared drive element 11 is being rotatably driven, the first air control element 3 is moved twice as quickly and twice as far as the second air control element 4.

A first cylinder tube ring 18 is mounted in a rotatable and axially fixed manner, coaxially in the first housing 2, from which radial ribs 19 project inwardly, which rigidly connect the shared drive element 11 to the first cylinder tube ring 18. In the exemplary embodiment, the shared drive element 11, the radial ribs 19, and the first cylinder tube ring 18 are integral with one another. The first cylinder tube ring 18 holds the shared drive element 11 coaxially in the housing 2. In the exemplary embodiment, rotary driving of the first cylinder tube ring 18 and, by way of the first cylinder tube ring 18, of the shared drive element 11 are carried out electromechanically using an electric motor 20, which is illustrated as a graphical symbol in the drawing. Other rotary drives are possible.

As described, as a result of the shared drive element 11 being rotatably driven by way of the two helical gears 7, 8, the two air control elements 3, 4 are jointly displaced in the same direction, wherein, due to the differing thread pitches of the two helical gears 7, 8, the first air control element 3, which is the interior one in the exemplary embodiment, is displaced, in the exemplary embodiment, twice as quickly and twice as far as the second air control element 4, which is the exterior one in the exemplary embodiment. As a result of the displacement, the distances between the two air control elements 3, 4 and air outlet openings 21, 22 of the two air channels 5, 6 change, whereby a surface area of annular cross-sections of the two annular air channels 5, 6 through which air can flow changes. By reducing the surface areas of the annular cross-sections of the two air channels 5, 6, the flow resistance of the air channels 5, 6 is increased, and air currents flowing through the two air channels 5, 6 are restricted. The two air control elements 3, 4 can thus also be interpreted as air volume control elements or as air restriction elements.

In the exemplary embodiment, the two air control elements 3, 4 can be displaced so far into the air outlet openings 21, 22 of the air channels 7, 8 as to close the air outlet openings 21, 22 and block air from flowing through the air channels 7, 8. Absolute air-tight blocking is not necessary, and gaps between the two air control elements 3, 4 and between the second air control element 4 and the housing 2, through which remaining air can flow, are possible.

The spindle 13 and the shared drive element 11, which is to say the first helical gear 7, form a first sliding guide 23 that is coaxial with respect to the axis of rotation 17 of the first helical gear 7 and that displaceably guides the first air control element 3 coaxially with respect to the axis of rotation 17 of the first helical gear 7. Likewise, the shared drive element 11 and the spindle nut 15, which is to say the second helical gear 8, form a second sliding guide 24 that is coaxial with respect to the axis of rotation 17 of the second helical gear 8 and that displaceably guides the second air control element 8 coaxially with respect to the axis of rotation 17. The two helical gears 7, 8, and thus also the two sliding gears 23, 24, are coaxial with respect to one another and coaxial in the housing 2, whereby the two air control elements 3, 4 are displaceably guided, coaxially in the housing 2 of the air vent 1 according to the invention.

For guiding the air current through the air vent 1, the air vent 1 comprises an air guide flap 25, which is mounted in the first cylinder tube ring 18 so as to be pivotable about a pivot axis 26 that is radial with respect to the housing 2. For pivoting the air guide flap 25, the air vent 1 comprises a second cylinder tube ring 27, which is disposed axially upstream from the first cylinder tube ring 18 and mounted rotatably in the housing 2. A pin 28, which protrudes into an axially parallel elongated hole 29 in the second cylinder tube ring 27, projects from the air guide flap 25 to the outside, on one side of the air guide flap 25, radially with respect to the housing 2. As a result of the two cylinder tube rings 18, 27 being rotated with respect to one another, the air guide flap 25, can be pivoted, as shown with dotted lines in FIG. 1, thereby guiding the air current through the air vent 1.

As a result of a rotation of the first cylinder tube ring 18, in which the air guide flap 25 is pivotably mounted, the air guide flap 25 can be rotated about the axis of rotation 17 of the two helical gears 7, 8, thereby making it possible to set a direction in which the air guide flap 25 guides the air current flowing through the air vent 1.

Both the rotation of the two cylinder tube rings 18, 27 with respect to one another for pivoting the air guide flap 25 and a shared rotation of the two cylinder tube rings 18, 27 for rotating the air guide flap 25 about the axis of rotation 17 are carried out electromechanically using the electric motor 20, or also using multiple electric motors (not shown).

The air guide flap 25 can, generally speaking, also be interpreted as an air guide element or as an air control element.

LIST OF REFERENCE NUMERALS

Air Vent 1 air vent
2 housing
3 first air control element
4 second air control element
5 first air channel
6 second air channel
7 first helical gear
8 second helical gear
9 unassigned
10 external thread
11 shared drive element
12 external thread
13 spindle
14, 14a internal thread
15 spindle nut
16 radial rib
17 axis of rotation
18 first cylinder tube ring
19 radial rib
20 electric motor
21 first air outlet opening
22 second air outlet opening
23 first sliding guide
24 second sliding guide
25 air guide flap
26 pivot axis
27 second cylinder tube ring
28 pin
29 elongated hole

The invention claimed is:

1. An air vent comprising a first air control element, wherein the air vent comprises a first helical gear having an axis of rotation and a first sliding guide for the first air control element which is parallel to the axis of rotation of the first helical gear, said first helical gear comprising a shared drive element as well as a first gear element for driving said first air control element, and that, when the first helical gear is rotatably driven, the first helical gear displaces the first air control element along the first sliding guide, wherein the air vent comprises a second air control element and a second sliding guide, which dispaceably guides said second air control element parallel to the first sliding guide, and that the air vent comprises a second helical gear that is parallel to the first helical gear, said second helical gear comprising said shared drive element as well as a second gear element for driving said second air control element.

2. The air vent according to claim 1, wherein the first and the second helical gears have differing thread pitches.

3. The air vent according to claim 1, wherein the shared drive element includes a shared drive external thread and a shared drive internal thread that is coaxial with respect to the shared drive external thread, that the first helical gear comprises the shared drive element, a first helical gear external thread and a spindle, the first helical gear external thread engages with the internal thread of the shared drive element, and that the second helical gear comprises the shared drive element and a second helical gear internal thread and a spindle nut, the second helical gear internal thread which engages with the external thread of the shared drive element.

4. The air vent according to claim 1, wherein one of the two air control elements is an air restriction element, which, when moving, restricts an air current flowing through the air vent.

5. The air vent according to claim 1, wherein the first air control element is disposed in the second air control element, and that the two air control elements delimit a first air channel including a first air outlet opening between one another, that the second air control element is disposed in a housing, and that the second air control element and the housing delimit a second air channel including a second air outlet opening between one another, and that the first air control element can be displaced in the second air control element so as to vary a cross-sectional surface area of the first air channel through which air can flow, and that the second air control element can be displaced in the housing so as to vary a cross-sectional surface area of the second air channel through which air can flow.

6. The air vent according to claim 5, wherein the first air control element can be displaced in the second air control element such that a distance between the first air control element and the first air outlet opening of the first air channel can be varied, and that the second air control element can be displaced in the housing such that a distance between the second air control element and the second air outlet opening can be varied.

7. The air vent according to claim 5, wherein the first air channel can be closed by way of the first air control element and/or that the second air channel can be closed by way of the second air control element.

* * * * *